(12) United States Patent
Aeschlimann et al.

(10) Patent No.: US 7,573,161 B2
(45) Date of Patent: Aug. 11, 2009

(54) POSITIONING DEVICE

(75) Inventors: Adrian Aeschlimann, Hilterfingen (CH); Reto Zwahlen, Heimberg (CH)

(73) Assignee: Fritz Studer AG (CH)

( * ) Notice: Subject to any disclaimer, the term of this patent is extended or adjusted under 35 U.S.C. 154(b) by 424 days.

(21) Appl. No.: 11/297,174

(22) Filed: Dec. 7, 2005

(65) Prior Publication Data
US 2006/0119191 A1 Jun. 8, 2006

(30) Foreign Application Priority Data
Dec. 8, 2004 (CH) .................................... 2035/04

(51) Int. Cl.
*H02K 41/00* (2006.01)
(52) U.S. Cl. ........................................................ 310/12
(58) Field of Classification Search .............. 310/12–15
See application file for complete search history.

(56) References Cited

U.S. PATENT DOCUMENTS

| | | | | |
|---|---|---|---|---|
| 4,916,340 | A | * | 4/1990 | Negishi ......................... 310/12 |
| 6,110,010 | A | | 8/2000 | Pflager et al. .................. 451/11 |
| 6,150,740 | A | * | 11/2000 | Slocum ......................... 310/12 |
| 7,193,339 | B2 | * | 3/2007 | Uchida ......................... 310/12 |
| 2004/0086208 | A1 | | 5/2004 | Kawahara et al. ............. 384/12 |

FOREIGN PATENT DOCUMENTS

| | | |
|---|---|---|
| DE | 196 43 518 A1 | 1/1998 |
| DE | 196 46 357 A1 | 6/1998 |
| DE | 199 48 490 A1 | 5/2001 |
| DE | 102 13 408 A1 | 10/2003 |
| WO | WO 02/33807 A1 | 4/2002 |

OTHER PUBLICATIONS

Jochen Schoenfeld "Hydrostatische Fuehrungen fuer Linearmotoren", from "Werkstatt und Betrieb", vol. 132, No. 3, Mar. 1999, pp. 6-8, Carl Hanser Verlag. (An english abstract is given on the top of the third page.
International Search Report 2004 2035/04 dated Mar. 4, 2005.

* cited by examiner

*Primary Examiner*—Dang D Le
(74) *Attorney, Agent, or Firm*—Ostrolenk Faber LLP

(57) ABSTRACT

The positioning device includes at least one displaceable carriage, liquid slide bearings on which the carriage is displaceable, and a carriage drive. The latter includes a first linear motor including a first primary part and a first secondary part that is opposite thereto and located in a first plane, and a second linear motor including a second primary part and a second secondary part that is opposite thereto and located in a second plane. The two linear motors are arranged in inclined positions such that the two planes are different and form an intersecting angle.

23 Claims, 2 Drawing Sheets

POSITIONING DEVICE

FIELD OF THE INVENTION

The present invention refers to a positioning device comprising at least one displaceable carriage and at least one linear motor.

BACKGROUND OF THE INVENTION

Positioning devices of this kind are e.g. used in machine tools for continuously positioning the tool in relation to the machined workpiece (see e.g. DE 199 48 490 A1). The use of a linear motor drive offers the advantage that its operation is contactless and that high speeds and accelerations can be produced, thereby allowing rapid movements of the carriage. One disadvantage, however, is that the attractive force created between the primary part and the secondary part of the linear motor may be so high that the carriage is subject to deformations and can no longer be positioned with sufficient accuracy. In circular grinding, for example, a highly precise positioning of the tool with accuracies in the submicrometer range is required.

The patent application DE 196 43 518 A1 describes a positioning device with a linear drive comprising a horizontal and a vertical aligned active unit. The passive units of the linear drive are attached to a body which has a rectangular cross-section and which is displaceable by means of an air bearing. This kind of bearing, however, is relatively complicated and costly, since a plurality of nozzle has to be arranged over the whole surface of the active units. Furthermore, the carrying force of the air bearing is limited.

SUMMARY OF THE INVENTION

Based on this state of the art, it is an object of the present invention to provide a positioning device of the kind mentioned in the introduction whose carriage can be positioned rapidly and accurately in an improved manner.

This is accomplished by a positioning device comprising at least one displaceable carriage, liquid slide bearings on which the carriage is displaceable, and a carriage drive. The latter comprises a first linear motor comprising a first primary part and a first secondary part that is opposite to the first primary part and located in a first plane and at least a second linear motor comprising a second primary part and a second secondary part that is opposite to the second primary part and located in a second plane. The linear motors are arranged in inclined positions such that the first plane and the second plane are different and form an intersecting angle.

BRIEF DESCRIPTION OF THE DRAWINGS

The invention will be explained hereinafter by means of a preferred exemplary embodiment and with reference to figures, where.

DETAILED DESCRIPTION OF THE PREFERRED EMBODIMENTS

Figure 1:
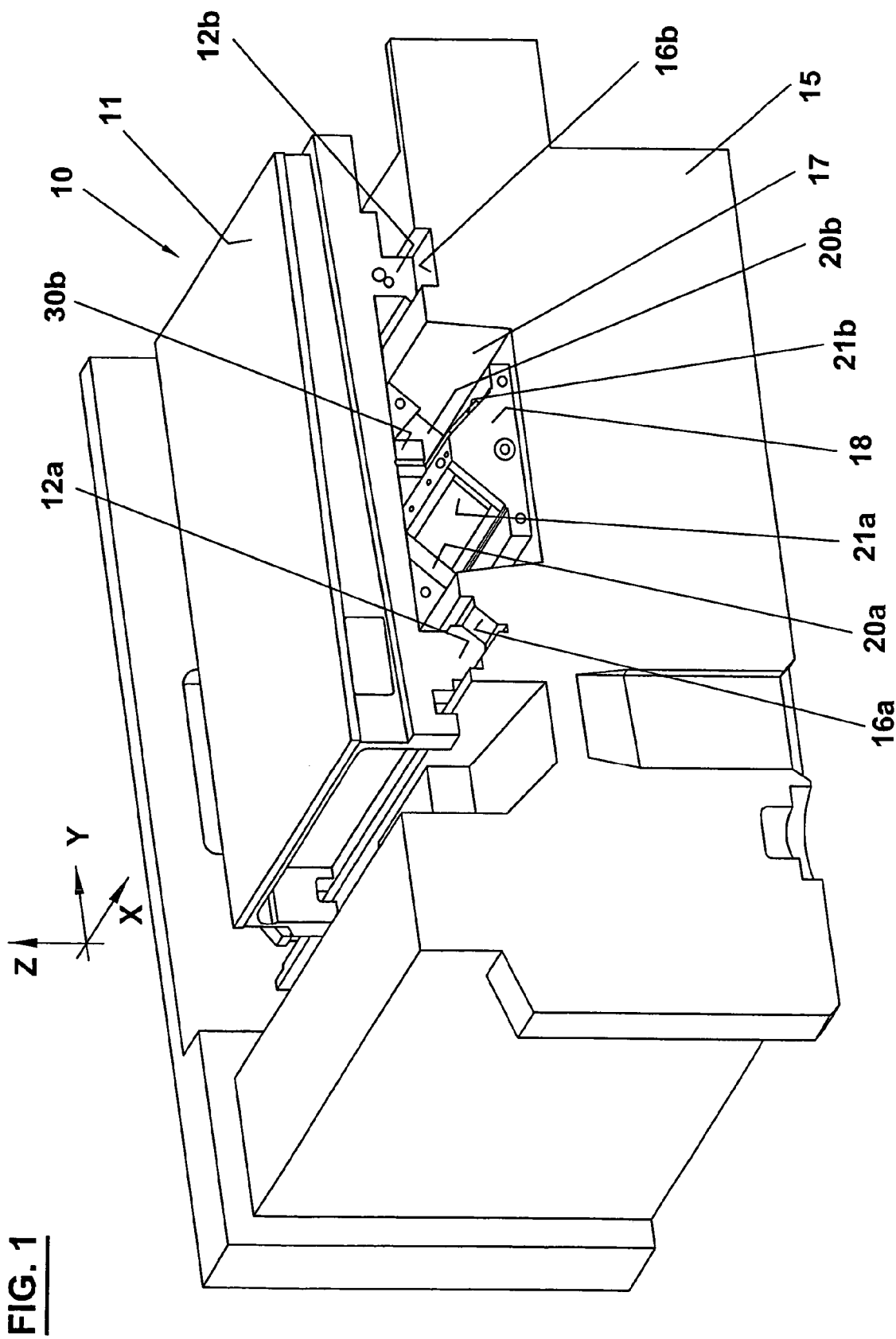
FIG. 1 shows a perspective view of the positioning device of the invention.

FIG. 1 shows a perspective view of the positioning device where the front part of the support 15 is omitted for the sake of clarity. As appears in the drawing, the positioning device comprises a carriage 10 that is displaceable along support 15 in the X direction. Carriage 10 comprises a base plate 11 whose bottom side is provided with projecting guide members 12a and 12b extending in the displacement direction X. The support 15 comprises guide rails 16a and 16b on which the respective guide members 12a and 12b are displaceable.

Guide members 12a, 12b and guide rails 16a, 16b are separated by a liquid located therebetween, typically oil. Bearings 12a, 16a, 12b, 16b are designed as hydrostatic slide bearings, during the operation of which the liquid is continuously supplied under pressure to the gap between guide members 12a, 12b and guide rails 16a, 16b through supply bores in guide members 12a, 12b, thereby forming a film on which carriage 10 is "floating". The required pressure is generated outside of bearings 12a, 16a, 12b, 16b by suitable means and regulated such that the thickness of the film is substantially constant.

The use of hydrostatic bearings offers the advantage that their operation is contactless and therefore free of wear and that highly accurate displacements are achieved even in the case of rapid directional changes and/or of high weight forces acting upon the carriage. Typically, displacements smaller than $\frac{1}{10}$ micrometer are possible.

It is conceivable to use hydrodynamic bearings as liquid slide bearings, in which case a separating liquid film is generated by the relative motion between guide members 12a, 12b and the corresponding guide rails 16a, 16b.

Figure 2:
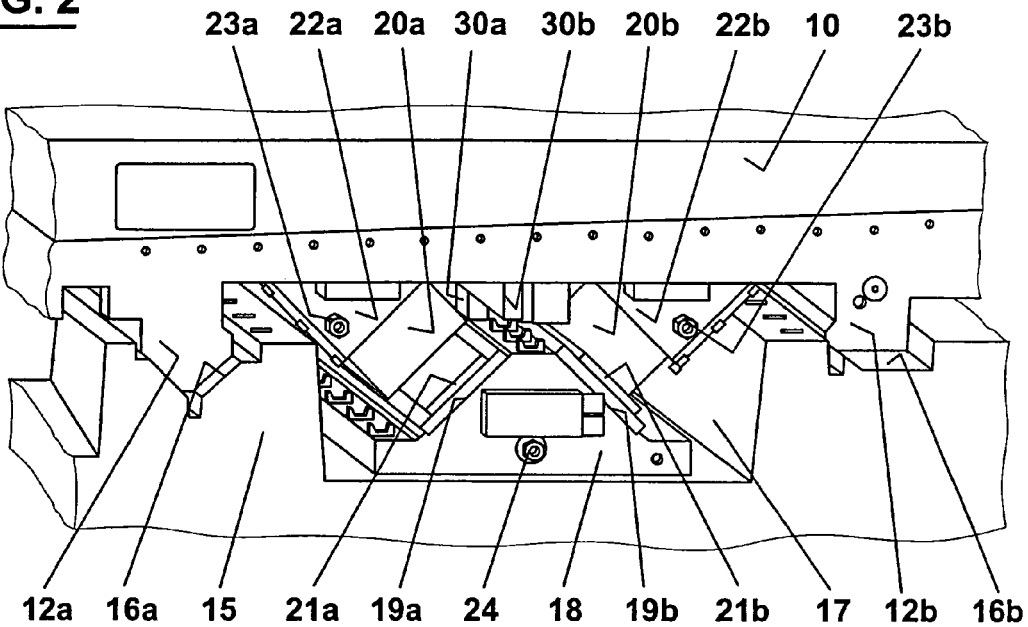
FIG. 2 shows a detail of FIG. 1.

Bearings 12a, 16a, 12b, 16b are in the form of guides freely supported, i.e. they are free of wrap-arounds, and are for instance—as shown in FIG. 2—in the form of a V-shaped flat guideway. It is also possible that both bearings 12a, 16a, 12b, 16b are designed as a V-shaped guideway or flat guideway.

As appears in FIGS. 1 and 2, support 15 includes a recess 17 which extends between guide rails 16a, 16b in the displacement direction X and in which a carriage drive is arranged. The latter includes a supporting body 18 and two linear motors each comprising a primary part 20a and 20b, respectively and a secondary part 21a and 21b, respectively. The primary parts 20a and 20b contain the electric windings, whereas the secondary parts 21a and 21b are provided with permanent magnets. By a suitable excitation of the windings, a travelling field can be generated that produces a thrust between the primary parts 20a and 20b, respectively, and the secondary parts 21a and 21b, respectively.

Figure 3:
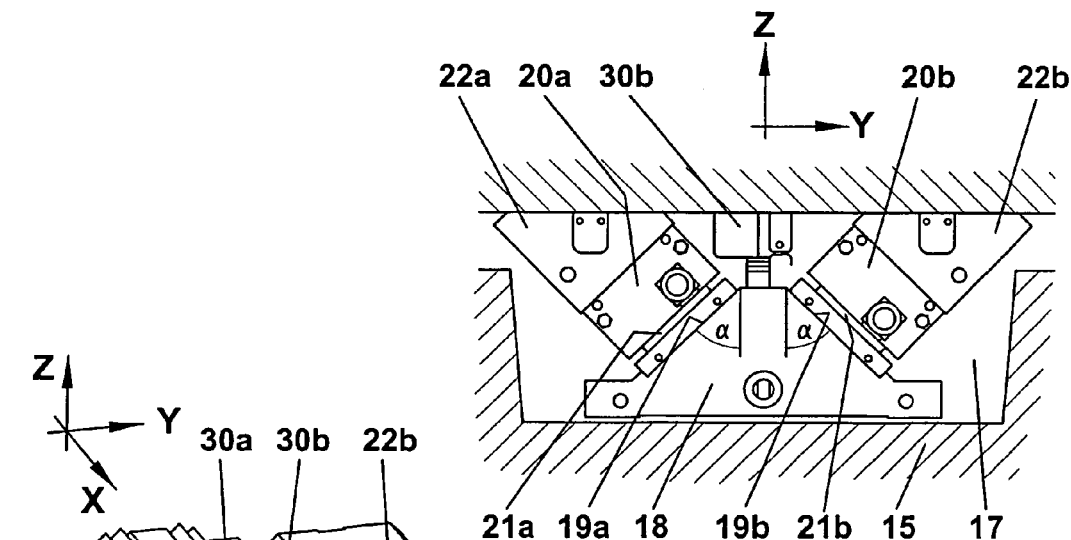
FIG. 3 shows a partly sectioned detail of FIG. 1 in a front view.
Figure 4:
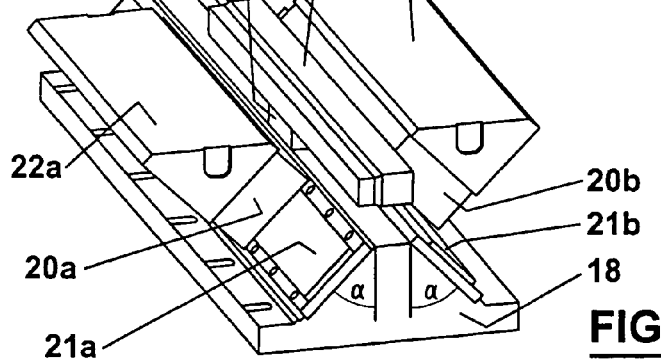
FIG. 4 shows the carriage drive and the displacement measuring system of the positioning device according to FIG. 1.

As appears in FIGS. 2 to 4 also, supporting body 18 comprises two inclined surfaces 19a and 19b which extend in the displacement direction X and on which the secondary parts 21a and 21b are mounted. The primary parts 20a and 20b are mounted opposite to the corresponding secondary parts 21a and 21b, respectively by means of mounting bodies 22a and 22b on carriage 10. The primary parts 20a and 20b are thus connected to the movable part of the carriage drive such that primary parts 20a, 20b and secondary parts 21a, 21b form respective short stator linear motors. Linear motors 20a and 21a as well as 20b and 21b operate contactlessly, the respective primary part 20a, 20b and secondary part 21a, 21b being separated from each other by a defined air gap that is typically in the millimeter range or smaller than 1 mm.

In the orientation of carriage 10 as shown in FIG. 1, bearings 12a, 16a, 12b, 16b are located in the XY plane. The normal to that plane (hereinafter called carriage normal) coincides with the Z direction. The inclination of surfaces 19a and 19b is chosen such that the angle α between the carriage normal and the plane in which the respective secondary parts 21a and 21b are arranged, is between 35 and 55 degrees and preferably equal to 45 degrees. The two planes 19a and 19b thus intersect at an angle that is equal to 2α. The primary parts 20a and 20b cooperating with the respective secondary parts 21a and 21b are also each inclined at an angle α with respect to the carriage normal.

In operation, linear motors 20a, 21a, 20b, 21b generate heat that has to be dissipated in a suitable manner in order to prevent the carriage 10 and support 15 from being subject to additional heating and thus to deformations. For cooling, primary parts 20a, 20b comprise an integrated cooling system and secondary parts 21a, 21b are provided with internal channels through which a coolant can be conducted. Furthermore, supporting body 18 and mounting bodies 22a, 22b serve as a cooling device, for which purpose they are provided with internal channels through which the coolant can be conducted. Lines for supplying coolant to the internal channels can be connected to bodies 22a, 22b and 18 via respective connections 23a, 23b, 24. Suitable coolants are e.g. aqueous liquids with anticorrosive additives such as are commonly used in machine tools. If the positioning device is used with a machine, e.g. a grinding machine, that comprises a cooling circuit itself, the cooling device 18, 22a, 22b is advantageously connected to that cooling circuit.

Between linear motors 20a, 21a, 20b, 21b a displacement measuring system 30a, 30b is arranged that serves for measuring the position of carriage 10. The stationary part 30a of the displacement measuring system is disposed on top of supporting body 18 between the two inclined surfaces 19a and 19b whereas the movable part 30b of the displacement measuring system is secured to carriage 10. Displacement measuring system is chosen such that the position of carriage 10 can preferably be determined with an accuracy in the nanometer range. A suitable displacement measuring system 30a, 30b is e.g. an optoelectronic displacement measuring system, where divisions on a scale system, e.g. a glass scale, are detected optically and corresponding electric displacement measuring signals are generated.

A suitable control system (not shown) is provided that evaluates the signals of displacement measuring system 30a, 30b and delivers signals to linear motors 20a, 21a, 20b, 21b to move carriage 10 according to the specified target position.

According to a further embodiment, a second carriage including a linear motor drive and a displacement measuring system is arranged on carriage 10 in order to form two driven axes (not shown in the figures). The construction of the linear motor drive and of the displacement measuring system of the second carriage is analogous to that of the corresponding devices of the first carriage. For positioning e.g. a tool in a plane, the displacement directions of the two carriages need not necessarily be arranged orthogonally to each other but may alternatively be arranged at an obtuse or acute angle to each other.

The positioning device of the invention is e.g. applicable in grinding machines, particularly circular grinding machines. In typical applications, the mass to be moved may be several hundred kilograms, typically in the range of 500 kg up to 1,500 kg. Linear motors 20a, 20b, 21a, 21b allow to attain accelerations up to 10 m/s$^2$ or more and speeds up to 30 m/s. The positioning accuracy is in the submicrometer range. The heat dissipated by cooling device 18, 22a, 22b is typically in the order of 1 kilowatt-hour or more.

Amongst others, the positioning device described so far offers the following advantages:

The inclined arrangement of linear motors 20a, 21a, 20b, 21b (hereinafter also called V-shaped arrangement) offers the advantage that the attractive forces generated between primary parts 20a, 20b and secondary parts 21a, 21b act on carriage 10 in a reduced manner. If α=45 degrees, this reduction is maximum: the resultant attractive force acting in the direction of the carriage normal is reduced by a factor $\sqrt{2}$ as compared to an arrangement where the linear motors are not inclined (α=90 degrees). Since the impact of the attractive forces upon carriage 10 is reduced, stronger linear motors 20a, 21a, 20b, 21b may be used and/or carriage 10 can be constructed in a lighter manner without subjecting carriage 10 to deformations.

Furthermore, the attractive forces generated by linear motors 20a, 21a, 20b, 21b may be used for preloading hydrostatic bearings 12a, 16a, 12b, 16b such that guide members 12a, 12b act upon guide rails 16a, 16b with a defined force. It is thus possible to use bearings that are freely supported, which are simpler and less expensive than e.g. encompassing bearings, while the necessary preload is also ensured when small or variable weight forces are acting upon the carriage.

The application of a V-shaped arrangement of the linear motors in combination with liquid slide bearings leads to a positioning device whose carriage is contactlessly, highly accurately and rapidly displaceable while a nearly jerk-free operation is ensured even if the displacements are small.

Furthermore, at a given construction height of the positioning device, the V-shaped arrangement of linear motors 20a, 21a, 20b, 21b leaves enough space for a relatively large and therefore effective cooling device 18, 22a, 22b. The two-part design of the linear motor drive also facilitates the dissipation of the heat produced by the latter.

The cooling device including supporting body 18 and mounting bodies 22a, 22b serves as an effective heat barrier that prevents a heat transfer to support 15 and carriage 10 or regulating the heat transfer so as to maintain support 15 and carriage 10 at a constant temperature. In this manner, dimensional variations of carriage 10 and of support 15 are prevented so that rapid and highly accurate carriage movements are always possible.

The V-shaped arrangement also allows arranging the displacement measuring system 30a, 30b between the linear motors 20a, 20b, 21a, 21b, thus providing a compact, symmetrical arrangement. This also allows a precise control of the carriage position in highly dynamic applications where carriage 10 is subject to high speeds and accelerations, since the angular deviation of the measured position is small, when e.g. the displacement direction of carriage 10 is reversed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A positioning device, comprising:
   at least one displaceable carriage,
   preloaded liquid slide bearings on which the carriage is displaceable, and
   a carriage drive, said carriage drive comprising
      a first linear motor comprising a first primary part and a first secondary part that is opposite to said first primary part and located in a first plane, and
      at least a second linear motor comprising a second primary part and a second secondary part that is opposite to said second primary part and located in a second plane,
   said first linear motor and said second linear motor being arranged in inclined positions such that said first plane and said second plane are different and form an intersecting angle.

2. The positioning device according to claim 1, wherein said preloaded liquid slide bearings are hydrostatic bearings or hydrodynamic bearings.

3. The positioning device according to claim 1, wherein said preloaded liquid slide bearings comprise guide rails and guide members lying on said guide rails.

4. The positioning device according to claim 3, wherein said carriage comprises a base plate from the underside of which said guide members project.

5. The positioning device according to claim 1, wherein said preloaded liquid slide bearings form two bearings which are arranged essentially in parallel and between which said first and second linear motor are arranged.

6. The positioning device according to claim 1, further comprising a cooling device for cooling said first and second primary part and said first and second secondary part.

7. The positioning device according to claim 6, wherein said cooling device
- comprises a supporting body on which said first and second secondary part are mounted, and
- mounting bodies by means of which said first and second primary part are attached to said carriage,
- said supporting body and said mounting bodies being provided with internal channels for receiving a coolant.

8. The positioning device according to claim 1, further comprising a displacement measuring system which serves for measuring the position of said carriage and which is arranged between said linear motors.

9. The positioning device according to claim 1, wherein said intersecting angle between said planes is in the range of 70 degrees to 110 degrees.

10. The positioning device according to claim 1, wherein said intersecting angle between said planes is equal to 90 degrees.

11. The positioning device according to claim 1, wherein a second carriage is arranged on said first carriage.

12. A positioning device, comprising:
- at least one displaceable carriage,
- liquid slide bearings on which the carriage is displaceable, and
- a carriage drive, said carriage drive comprising
  - a first linear motor comprising a first primary part and a first secondary part that is opposite to said first primary part and located in a first plane, and
  - at least a second linear motor comprising a second primary part and a second secondary part that is opposite to said second primary part and located in a second plane,
- said first linear motor and said second linear motor being arranged in inclined positions such that said first plane and said second plane are different and form an intersecting angle, wherein said intersecting angle between said planes is in the range of 70 degrees to 110 degrees.

13. A grinding machine comprising a positioning device according to claim 12.

14. A circular grinding machine comprising a positioning device according to claim 12.

15. The positioning device according to claim 12, wherein said liquid slide bearings are hydrostatic bearings or hydrodynamic bearings.

16. The positioning device according to claim 12, wherein said liquid slide bearings comprise guide rails and guide members lying on said guide rails.

17. The positioning device according to claim 16, wherein said carriage comprises a base plate from the underside of which said guide members project.

18. The positioning device according to claim 12, wherein said liquid slide bearings form two bearings which are arranged essentially in parallel and between which said first and second linear motor are arranged.

19. The positioning device according to claim 12, further comprising a cooling device for cooling said first and second primary part and said first and second secondary part.

20. The positioning device according to claim 19, wherein said cooling device
- comprises a supporting body on which said first and second secondary part are mounted, and
- mounting bodies by means of which said first and second primary part are attached to said carriage,
- said supporting body and said mounting bodies being provided with internal channels for receiving a coolant.

21. The positioning device according to claim 12, further comprising a displacement measuring system which serves for measuring the position of said carriage and which is arranged between said linear motors.

22. The positioning device according to claim 12, wherein said intersecting angle between said planes is equal to 90 degrees.

23. The positioning device according to claim 12, wherein a second carriage is arranged on said first carriage.

* * * * *

UNITED STATES PATENT AND TRADEMARK OFFICE
CERTIFICATE OF CORRECTION

PATENT NO. : 7,573,161 B2 Page 1 of 1
APPLICATION NO. : 11/297174
DATED : August 11, 2009
INVENTOR(S) : Aeschlimann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 530 days.

Signed and Sealed this

Seventh Day of September, 2010

David J. Kappos
*Director of the United States Patent and Trademark Office*